J. C. BERTSCH.
PROCESS OF REFRIGERATION.
APPLICATION FILED SEPT. 17, 1915.

1,246,849.

Patented Nov. 20, 1917.

INVENTOR.
John C. Bertsch
BY
HIS ATTORNEY IN FACT

UNITED STATES PATENT OFFICE.

JOHN C. BERTSCH, OF EDGEWOOD PARK, PENNSYLVANIA.

PROCESS OF REFRIGERATION.

1,246,849.     Specification of Letters Patent.     Patented Nov. 20, 1917.

Application filed September 17, 1915. Serial No. 51,207.

*To all whom it may concern:*

Be it known that I, JOHN C. BERTSCH, a citizen of the United States, and a resident of Edgewood Park, in the county of Allegheny and State of Pennsylvania, have made a new and useful Invention in Process of Refrigeration, of which the following is a specification.

This invention relates to an improved process of mechanical refrigeration by the evaporation and condensation of a volatile fluid.

An object of this invention is to provide a process whereby all danger to life and property by fire, explosions, bursting of vessels, and leakage of fluid is eliminated; the process being accomplished by performing the condensation of a fluid within a vessel open to the pressure of the atmosphere, in contradistinction to the process used heretofore, by which the fluid is condensed within a closed vessel either under pressures much above or considerably below that of the atmosphere.

In carrying out this process the heat of compression is taken up by mixing the working fluid within the compressor with a sealing liquid which may also serve as a lubricant, and agitating the contents of the open condenser by discharging the mixture of fluid vapor and other liquid under the submergence of the latter into the open condenser.

The apparatus utilized in the process is charged and recharged with fluid and other liquid by simply pouring both into the open vessel, instead of exhausting a closed vessel and evaporating the fluid into the same, as required with the old processes.

This process permits of the use of mechanical refrigeration with perfect safety in inhabited places and by the most ignorant people, by employing a volatile fluid which is non-inflammable, non-explosive and insoluble in water.

My improved process is best explained by referring to a diagrammatic sketch shown in the accompanying drawing, which illustrates in a general way apparatus which may be utilized in carrying out the different steps of the process.

Figure 1:
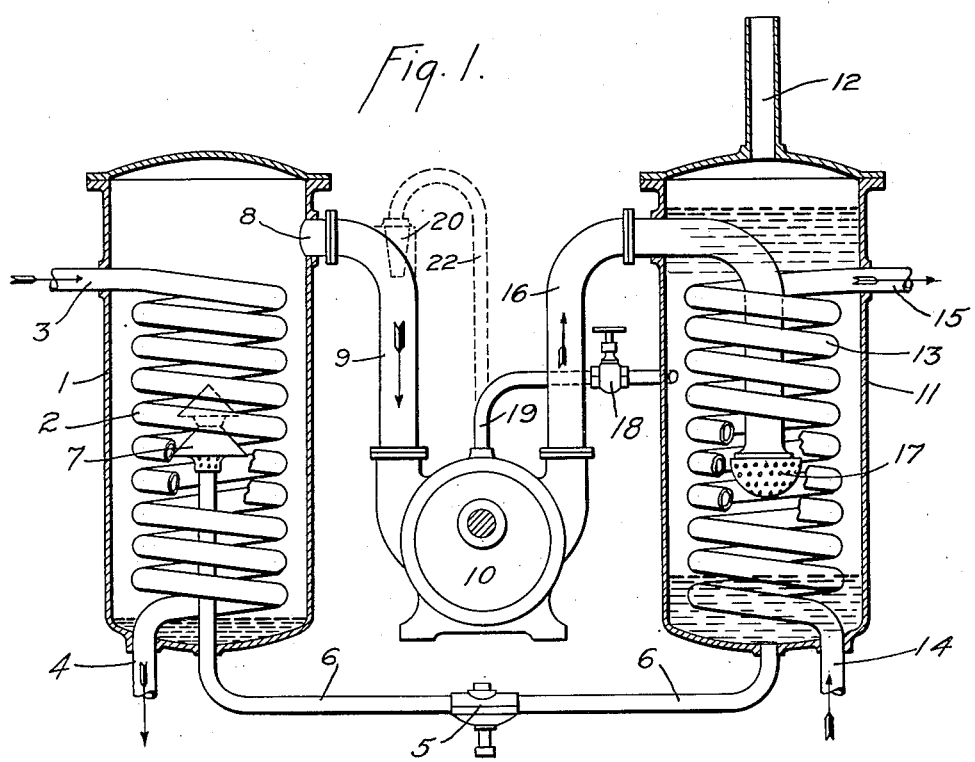
Figure 1 is a vertical section and, in part, an elevation of an apparatus which may be used for carrying out my improved process.
Figure 2:
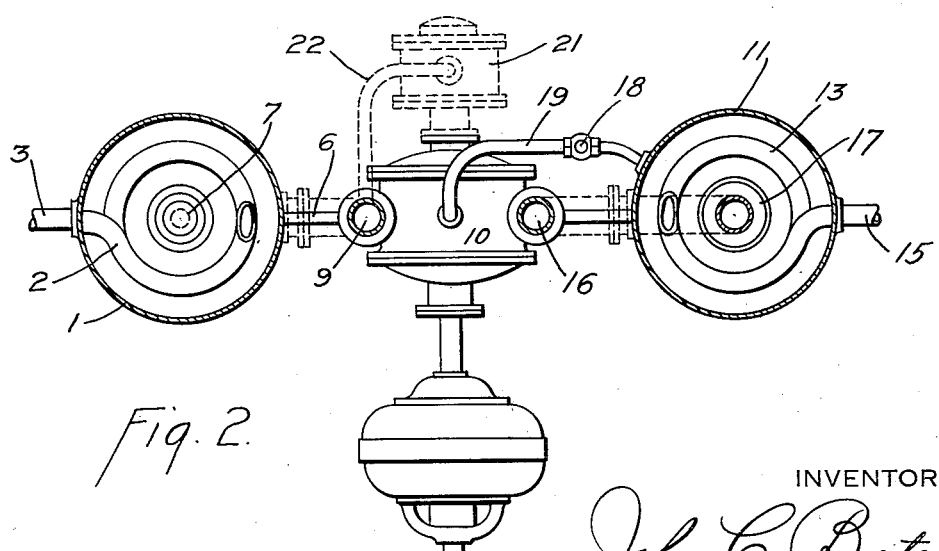
Fig. 2 is a horizontal section and, in part, a plan view of the apparatus shown in Fig. 1.

In the drawings, 1 is an evaporator for the evaporation of the volatile fluid under an absolute pressure much below that of the atmosphere. Within evaporator 1 is a coil 2 through which flows the cold carrier, such as water, brine, or the like which is cooled by giving up its heat to the evaporating fluid, 3 being the inlet and 4 the outlet of the circulating cold carrier. The fluid enters the evaporator 1 through regulating valve 5 and liquid line 6 and is atomized and distributed within the evaporator by an atomizer 7. The vapor resulting from the evaporation of the fluid passes through opening 8 and vapor pipe 9 into the exhauster 10.

A vessel 11, open to the atmosphere by vent pipe 12, forms the condenser, which is filled with sealing or other liquid. The condenser 11 is provided with a cooling coil 13, through which flows the cooling water for carrying off the heat imparted to the working fluid and other liquid, 14 being the water inlet and 15 the water outlet.

The mixture of vapor and other liquid is discharged by the exhauster 10 through pipe 16 and distributer 17 into condenser 11.

As the working medium, I employ a volatile fluid with a boiling point much above the highest temperature of the atmosphere, and of a specific gravity much greater than that of water and the lubricant. As an example of such a fluid, I may employ carbon tetrachlorid ($CCl_4$).

The sealing liquid which may serve as a lubricant may be either water or glycerin, or a mixture of both, and as each of them is much lighter than the working fluid in liquid state, they float on top of the latter, and pass by gravity through regulating valve 18 and pipe 19 to the exhauster, for lubricating all moving parts and mixing with the fluid.

The exhauster 10 may be of any of the well-known types of blowers, vacuum pumps or entrainment turbines, (such as the Leblanc pump or the Thiesen pump) and in case an absolute pressure sufficiently low for the production of the required low temperature within the evaporator cannot be had by the exhauster, the same may be augmented by a suitable jet or ejector 20, for the operation of which either steam or compressed air may be used, the air may be furnished by an air compressor 21, connected to the exhauster shaft, and led to the ejector through a pipe 22, as shown in drawings by dotted lines.

The exhauster 10 may be operated by a motor, or by any other suitable agent.

Carbon tetrachlorid, which I now prefer to use as the working fluid, is a non-explosive, non-inflammable and a substantially neutral fluid, insoluble in water, and extensively used as a fire extinguisher. Its boiling point at atmospheric pressure is about 170 degrees Fahrenheit; its specific gravity is about 1.63, its vapor being about six times heavier than air under equal pressures and temperatures. At zero degrees Fahrenheit, it evaporates under a pressure of about 0.45 inches of mercury, and at 32 degrees Fahrenheit under one of about 1.3 inches.

The advantages of my improved process will be evident.

As no pressures above the atmosphere are required, and inasmuch as a fluid can be used which is neutral and harmless, dangers to life and property do not exist at all, whereas, in the old process, operating with pressures of from one to ten atmospheres gage, fires, explosions and suffocation by escaping fluid are very frequent.

With the "water-vapor" process, which is extremely expensive in its operation if low temperatures are to be provided, steam is indispensable for its application, hence its use for domestic service is prohibited, whereas, my improved process, operating with power alone, is admirably suited for application to domestic service of all kinds.

To produce a temperature of ten degrees Fahrenheit, it requires the removal of about 2000 cubic feet of vapor per minute and the maintenance of an absolute pressure of about 0.065 inches of mercury, per ton of refrigeration per day with the water-vapor process; whereas, the same work can be performed by my improved process by the removal of about 320 cubic feet of vapor per minute at an absolute pressure of about 0.644 inches of mercury.

Air entering an exhauster, compressor or any other part of a system operating on the old process, remains locked up, and must be constantly compressed at a great expense for lost energy and reduced cooling and condensing surfaces, whereas with my improved process, such air is simply discharged and liberated in the condenser, where it assists in the agitation of the sealing liquid.

The free use of sealing liquid or lubricant and the mixing of the same with the working fluid does away with all oiling devices required with the old process. The free discharge of the mixture of working fluid and other liquid under complete submergence in the latter, agitates the contents of the open condenser, thereby increasing the heat conductivity of the cooling coil. As is well known, the heat transmission coefficient between and agitated and a flowing liquid is many times the one between a still gas and a flowing liquid, as used in the old process.

The removal of sealing liquid or lubricant carried with the working fluid into the evaporator is accomplished in my process by simply draining and returning the drainage to the condenser, while the apparatus is at rest, without the loss of either working fluid or other liquid, whereas, in the old process, such removal can only be had by either wasting fluid and lubricant, or by employing expensive auxiliary apparatus.

The materials employed in my improved process may be easily obtained at any place and at a low cost, transportation not being restricted in the least, whereas the fluids used in the old process must be handled in special, heavy containers, from certain distributing points, and under more or less restricted regulations by the common carrier.

Having thus described the essential features and great advantages of my improved process, I claim:

1. The process of refrigeration which consists in maintaining at atmospheric pressure a body of liquid having a greater specific gravity and a lower boiling point than water, withdrawing liquid from said body and expanding it in a closed vessel, withdrawing vapor from said vessel, compressing the same, and delivering it to the body of liquid below the surface thereof.

2. The process of refrigeration which consists in maintaining at atmospheric pressure a body of liquid having a greater specific gravity and a lower boiling point than water, withdrawing liquid from said body and expanding it in a closed vessel, withdrawing the vapor from said vessel, compressing the same, and delivering it to the body of liquid below the surface thereof, and cooling the body of liquid.

3. The process of refrigeration which consists in maintaining within a vessel subjected to atmospheric pressure two liquids of different specific gravities, which are substantially mutually insoluble, in continuously withdrawing from said vessel the heavier of said liquids and expanding the same in a closed vessel, in withdrawing the vapor due to said expansion and delivering it to the open vessel in liquid form below the level of the liquid therein.

4. The process of refrigeration which consists in maintaining within an open vessel two substantially chemically inactive liquids of different specific gravities, one of which is carbon tetrachlorid ($CCl_4$), in continuously withdrawing from said vessel carbon tetrachlorid and expanding the same in a closed vessel, in withdrawing the vapor from said closed vessel, compressing the same and delivering it to the body of liquid below the surface thereof.

5. The process of refrigeration which consists in maintaining at atmospheric pressure in a vessel a body composed of two liquids of different specific gravities, the heavier of which has a greater specific gravity and a lower boiling point than water, withdrawing the heavier of said liquids from said vessel and expanding it in a closed vessel at the expense of the heat of the agent to be refrigerated, withdrawing the vapor from said closed vessel, compressing the same and delivering it to the body of liquid in the open vessel below the surface of said liquid, and cooling the liquid in the open vessel.

6. The process of refrigeration which consists in maintaining at atmospheric pressure a body made up of carbon tetrachlorid and a lighter liquid, withdrawing the carbon tetrachlorid from said body and expanding it in a closed vessel at the expense of the heat of the agent to be refrigerated, withdrawing the carbon tetrachlorid vapor so expanded, compressing the same and delivering it to the body of liquid below the surface thereof, and cooling the body of liquid.

7. The method of obtaining refrigeration by means of two mutually inactive liquids of different specific gravities, contained in a vessel open to the atmosphere, which consists in expanding the heavier of said liquids derived from said vessel in a closed vessel, withdrawing the vapor due to said expansion and delivering it to the open vessel below the surface of the lighter of said liquids.

8. The method of obtaining refrigeration by means of two substantially mutually insoluble liquids of different specific gravities, contained in an open vessel, which consists in removing from said vessel the heavier of said liquids and expanding the same in a closed vessel, withdrawing the vapor due to said expansion and delivering it in liquid form to the open vessel below the level of the lighter liquid.

9. The process of refrigeration which consists in maintaining at atmospheric pressure a body made up of carbon tetrachlorid and another liquid of less specific gravity, continuously withdrawing the carbon tetrachlorid from said body, expanding it in a closed vessel at the expense of the heat of the agent to be refrigerated, withdrawing the carbon tetrachlorid vapor from said closed vessel, compressing the same and delivering it to the body of liquid in spray form and below the surface of the carbon tetrachlorid in said body, and cooling said body of liquid.

10. The process of refrigeration which consists in the evaporation in a closed vessel of a non-inflammable, non-explosive and, in water, substantially insoluble volatile fluid having a specific gravity greater than water and a boiling point at atmospheric pressure much above atmospheric temperatures, withdrawing the vapor from said vessel, compressing the same and delivering it below the surface of a body of the same liquid subjected to atmospheric pressure, interposing between the surface of said liquid and the atmosphere a seal composed of a lighter liquid insoluble in said heavier liquid, and cooling said body of liquid.

11. In a process of mechanical refrigeration the succeeding steps of, first: feeding into a closed vessel, containing means for circulating a cold carrier in a closed circuit, a volatile fluid much heavier than water and substantially chemically inactive in the presence of water, and of a boiling temperature much above the highest summer temperature of the atmosphere at the pressure of the latter; second, atomizing said fluid fed into said closed vessel by the pressure of the atmosphere or gravity; third: evaporating said atomized fluid within said closed vessel under a pressure much below that of the atmosphere by the heat of the cold carrier circulating through said closed vessel in a closed circuit; fourth: exhausting from said closed vessel the fluid vapors produced by said evaporation and compressing same to the pressure of the atmosphere for a partial liquefaction of the fluid vapor; fifth: mixing said exhausted vapors with water or lubricant during the period of compression for facilitating a partial cooling and liquefaction of said vapors, and discharging and distributing the mixture of compressed fluid and water or lubricant under the submergence of the latter into a vessel open to the atmosphere and containing liquid fluid and water or lubricant in separate layers, and, sixth: cooling the discharged mixture of fluid and water or lubricant within said open vessel by cooling water circulating in a closed circuit through the contents of said open vessel for completely condensing the fluid vapor and separating the latter from the water or lubricant.

In testimony whereof, I have hereunto subscribed my name this 16th day of September, 1915.

JOHN C. BERTSCH.